US00RE45849E

(19) United States
(12) Reissued Patent
Cooke, Jr.

(10) Patent Number: US RE45,849 E
(45) Date of Reissued Patent: Jan. 19, 2016

(54) APPLICATION OF DEGRADABLE POLYMERS IN SAND CONTROL

(71) Applicant: Claude E. Cooke, Jr., Montgomery, TX (US)

(72) Inventor: Claude E. Cooke, Jr., Montgomery, TX (US)

(21) Appl. No.: 14/491,727

(22) Filed: Sep. 19, 2014

Related U.S. Patent Documents

Reissue of:
(64) Patent No.: 8,439,108
Issued: May 14, 2013
Appl. No.: 13/543,321
Filed: Jul. 6, 2012

U.S. Applications:
(60) Division of application No. 11/774,819, filed on Jul. 9, 2007, now Pat. No. 8,215,385, which is a division of application No. 11/804,612, filed on May 18, 2007, now Pat. No. 7,625,846, which is a continuation of application No. 10/845,737, filed on May 14, 2004, now abandoned.

(60) Provisional application No. 60/470,738, filed on May 15, 2003.

(51) Int. Cl.

| | |
|---|---|
| ***E21B 43/12*** | (2006.01) |
| ***C09K 8/68*** | (2006.01) |
| ***C09K 8/508*** | (2006.01) |
| ***C09K 8/512*** | (2006.01) |
| ***C09K 8/88*** | (2006.01) |
| *C08G 63/08* | (2006.01) |
| *C08G 63/06* | (2006.01) |

(52) U.S. Cl.
CPC . *C09K 8/68* (2013.01); *C09K 8/508* (2013.01); *C09K 8/512* (2013.01); *C09K 8/685* (2013.01); *C09K 8/88* (2013.01); *C09K 8/887* (2013.01); *C08G 63/06* (2013.01); *C08G 63/08* (2013.01); *C09K 2208/24* (2013.01); *Y10S 507/903* (2013.01); *Y10S 507/923* (2013.01); *Y10S 507/925* (2013.01); *Y10S 507/926* (2013.01)

(58) Field of Classification Search
CPC ..... C09K 8/508; C09K 8/88; C08G 63/06; C08G 63/08; Y10S 507/902; Y10S 507/903; Y10S 507/925; Y10S 507/926
USPC ..... 166/227, 376, 228, 229, 304, 381, 51, 166/278; 507/260
See application file for complete search history.

(56) References Cited

U.S. PATENT DOCUMENTS

| | | | | |
|---|---|---|---|---|
| 3,216,497 | A * | 11/1965 | Howard et al. | E21B 43/04 166/278 |
| 7,196,040 | B2 * | 3/2007 | Heath et al. | 507/219 |
| 7,476,644 | B2 * | 1/2009 | Cooke, Jr. | 507/219 |
| 8,215,385 | B2 * | 7/2012 | Cooke, Jr. | 166/227 |
| 2002/0020527 | A1 * | 2/2002 | Kilaas et al. | B01D 39/1653 166/250.01 |

FOREIGN PATENT DOCUMENTS

| | | | |
|---|---|---|---|
| WO | WO 0194744 A1 * | 12/2001 | C09K 8/536 |

* cited by examiner

*Primary Examiner* — Timothy J Kugel
(74) *Attorney, Agent, or Firm* — Claude Cooke, Jr.; Cooke Law Firm

(57) ABSTRACT

Degradable polylactic or polyhydroxyalkanoate polymers may be used to viscosify aqueous fluids for use in wells, Sand control screen or liner can be coated with a solid degradable polymer during placement in a well. Mechanical changes or flow changes in a well can be caused by solid degradable polymer that changes physical properties after it is placed in a well. Parts of devices or entire devices can be made of solid degradable polymer that converts to a fluid after selected times in an aqueous environment in a well.

8 Claims, 3 Drawing Sheets

APPLICATION OF DEGRADABLE POLYMERS IN SAND CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a divisional application of application Ser. No. 11/774,819, filed on Jul. 9, 2007, now U.S. Pat. No. 8,215,385, which is a divisional application of application Ser. No. 10/845,737, filed May 14, 2004, now abandoned, which claims the benefit of U.S. Provisional Application No. 60/470,738, filed May 15, 2003.

BACKGROUND OF THE INVENTION

1. Field of the Invention

This invention pertains to mechanical and chemical operations in wells. In one embodiment, polymer and method of preparing viscous fluid for use in wells is provided. In another embodiment, material and methods are provided for coating of sand control screens used in wellbores. In another embodiment, this invention pertains to delayed mechanical or flow changes in a wellbore after equipment is placed in the well. In another embodiment, this invention pertains to equipment that is placed in a wellbore and is degraded in the wellbore by contact with aqueous fluid.

2. Discussion of Related Art

A large number of mechanical and chemical operations are carried out in and around wells. Most of these wells are used for producing hydrocarbons from the earth. They are located at depths ranging from a few hundred feet below the surface of the earth to more than 30,000 feet. The temperature at the bottom of the wells likewise varies over a wide range—from about 100° F. to more than 400° F.

After the hole is drilled in the earth in the process of constructing a well, the process of placing casing in the well and cementing it in place is commenced. Mechanical devices to aid in the cementing process may be placed on the outside of the casing before it is placed in the hole. Instruments and communication cables may be placed on the casing. Multiple lateral holes may be drilled from a single hole and casing may be placed in each. When casing has been cemented, the process of "completing" the well may begin. This involves forming holes ("perforating") the casing opposite an interval of a formation where fluids are to be produced or injected and, in most cases, placing tubing in the well. Various types of mechanical equipment may be placed in the wellbore, for safety, flow control and other purposes. Viscous, non-damaging fluids having a selected specific gravity are needed in wells during completion operations. In many wells various types of treatment fluids are then injected into the well to provide greater capacity of the well to produce hydrocarbons, in processes such as hydraulic fracturing and acidizing, called "stimulation" processes. The use of a degradable polymer in the form of ball sealers or particulates to divert fluid or control fluid loss from a well during completion or stimulation operations has been disclosed. (U.S. Pat. No. 4,716,964)

In some wells, the formation where hydrocarbons are found has low mechanical strength, which can result in "sand" being produced into the well along with hydrocarbons. The well then requires application of a "sand control" process. One of these processes requires placing a "screen" in the well. The solid particles (cuttings) and drilling fluid in the well may plug or partially plug the screen as it is placed in a well. This problem can be particularly severe in directional or horizontal wells. A recent U.S. Patent Application Publication (US2002/0142919 A1) discloses screen coatings that melt or dissolve within a wellbore and release reactive materials effective in degrading or dissolving materials that could plug a screen. The problem of screen plugging during placement was recognized many years ago ("Downhole Protection of Sand Control Screens," Society of Petroleum Engineers Paper No. 8803, 1980).

In well operations used for completing or stimulating a well, viscous fluids may be used. In most cases, it is desirable that the fluid become lower viscosity with time after it is placed in a well or formation around a well. When the fluid becomes low viscosity it should contain no significant amount of solid or gel material. One example application of such fluids is hydraulic fracturing of wells. U.S. Patent Application Publication 2003/0060374A1, which is hereby incorporated by reference herein, discloses the use of highly concentrated degradable polymers in an aqueous liquid in such application. As explained in that Publication, there is a need for fracturing fluids that degrade to low viscosity without leaving a residue.

Other applications where a viscous fluid may be injected into a well or used in a well include completion fluids, perforating fluids and fluids for carrying gravel (sand) into a well. These fluids are preferably solids-free and degradable to low viscosity fluid having low solid or gel content that could degrade permeability of a porous rock. Other applications where a viscous liquid in a wellbore may be advantageous include a completion or workover fluid that is placed in a well during running of a mechanical device into the well or other mechanical operation in the well. These fluids may contain high concentrations of compounds soluble in water that increase the density of the fluid, such as sodium bromide or zinc bromide, or solid weighting materials. The viscosifying material in the fluids should degrade with time and leave little or no residue of solid or gel that could damage the permeability of a formation around the well.

A wide variety of mechanical devices are placed in wells during completion and workover operations. These devices are used to control fluid flow, to seal around tubulars in the well, to perform measurements of physical or chemical parameters and various other purposes. These devices may be needed for only a limited time and then an operator may wish to have them no longer effective or to no longer have mechanical strength. For example, packers, bridge plugs and cement retainers may be needed for a limited time in a well. There may be a need to release a mechanical device or open a port after a selected time in an inaccessible portion of a wellbore, such as in an annulus between tubular strings, where an aqueous fluid is located.

What are needed in a variety of well operations or processes are viscous liquids that degrade to low viscosity liquid at a predictable rate and leave low amounts of solid or gel residue, a degradable coating for screens, and solids that lose mechanical strength at a predictable rate in the presence of an aqueous liquid to allow delayed flow or mechanical changes in inaccessible locations in wellbores or degradation of mechanical equipment that is no longer needed in a wellbore.

SUMMARY OF THE INVENTION

Degradable polymers and methods for using in wells are provided. In one embodiment, the degradable polymer is used to viscosify fluids used in wellbore operations. In another embodiment, the degradable polymer is used to protect a sand control screen from plugging as it is placed in a well. In yet another embodiment, the degradable polymer is used to delay to a selected range of time a change in mechanical or flow conditions in a well. In yet another embodiment, the solid degradable polymer is used to form equipment that is temporarily used in well operations.

DETAILED DESCRIPTION OF THE INVENTION

Figure 1:
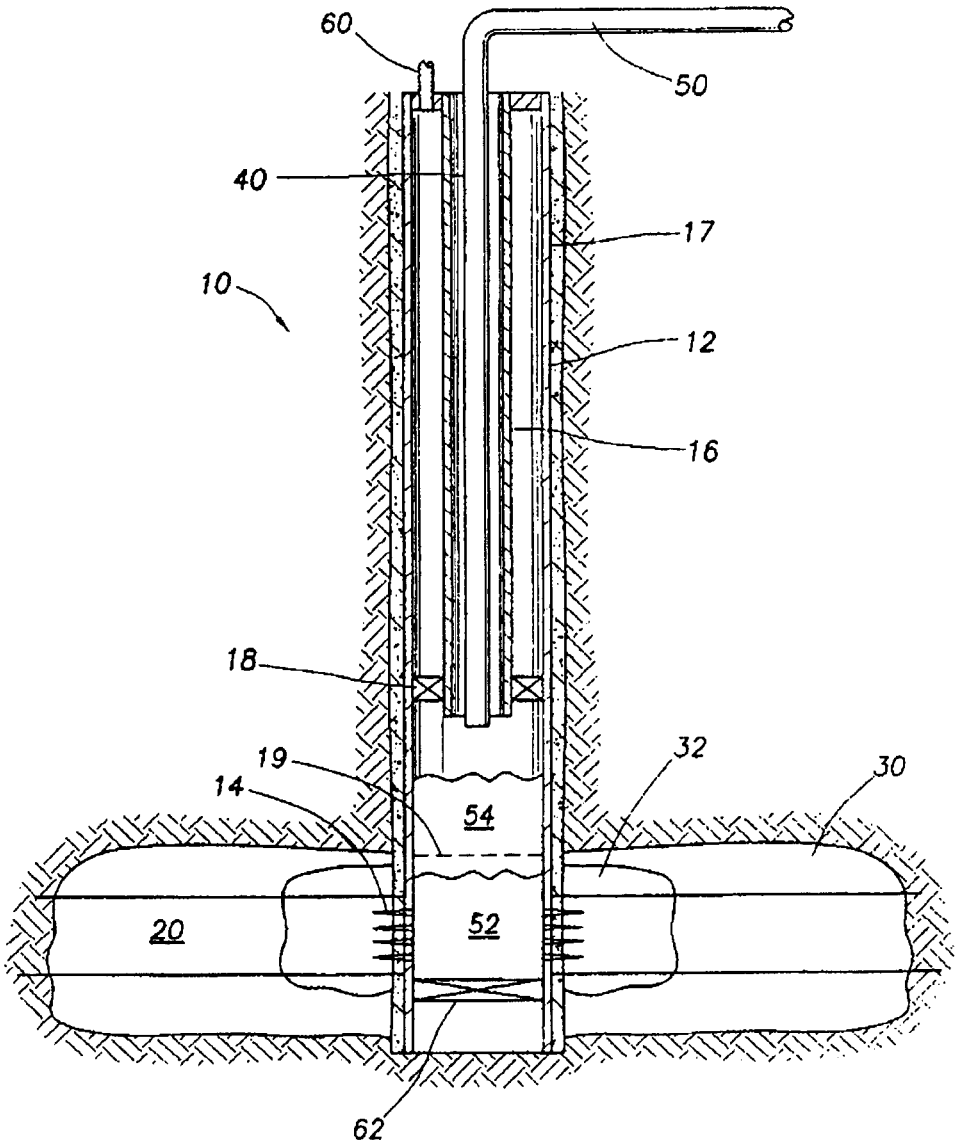
FIG. 1 shows a sketch of a cased well having tubing and the surrounding formation.

Referring to FIG. 1, wellbore 10 penetrates formation 20 where fluid is to be produced or injected. Wellbore 10 has casing 12 extending through formation 20, casing 12 being cemented in place by cement sheath 17. Perforations 14 have been formed through the wall of casing 12 and cement sheath 17 into formation 20. Perforations 14 may extend over the entire thickness of formation 20 or may extend only over a selected interval of formation 20 less than the total thickness surrounding wellbore 10. In some wells, hydraulic fracture 30 may have been formed around wellbore 10 by a previous treatment employing conventional fracturing fluid and proppant, using techniques well-known in industry. Alternatively, fracture 30 may not be present. Tubing 16 may have been suspended inside casing 12 and packer 18 may have been set near the bottom of tubing 16 to seal the annulus between tubing 16 and casing 12. Packer 18 may not be present in some wells, tubing 16 may not be present in some wells, and even casing 12 may not be present in some wells, although most wells in which the methods disclosed here will be applied contain casing and tubing with a packer near the bottom of the tubing. Packer 18 may have a controllable port for circulating fluids in the annulus of the well (not shown) or tubing 16 may be releasable from packer 18 to allow circulation of fluids down the tubing and up the tubing-casing annulus. Alternatively, tubing 16 may contain a sliding sleeve above and near packer 18, which is well known in industry.

In an embodiment for damage removal near wellbore 10, the materials and methods disclosed in U.S. Patent Application Publication 2003/0060374A1, which is incorporated by reference, may be used to form short hydraulic fracture 32 around wellbore 10 by injecting the degradable fracturing fluid at a pressure above the fracturing pressure of formation 20. The fracturing fluid disclosed herein is similar to fracturing fluids normally used, in which a polymer is dispersed in a liquid to increase viscosity of the liquid, and has theological properties similar to the conventional fracturing fluids. The fracturing fluid disclosed herein is a more dilute mixture of the degradable polymer contained in the "polymer phase" disclosed in the cited '374 Publication, and it may be used to form hydraulic fracture 30 or hydraulic fracture 32, as shown in FIG. 1. The preferred degradable polymer is a polymer that is polymerized to a preferred range of molecular weight or is degraded (decreased in molecular weight) by reaction with water (herein "water-degradable") to a desirable range of molecular weight for use in a wellbore fluid. The polymer is dispersed or dissolved in an aqueous liquid and then degrades to mostly water-soluble monomers or oligomers over a period of time in the presence of water.

The use of solid water-degradable polymers in wells is known. Their use in wellbores for diverting fluids between perforations or decreasing fluid loss from a hydraulic fracture when particles of the polymer are dispersed in fracturing fluid has been disclosed. U.S. Pat. No. 4,716,964 discloses use of such polymers in "ball sealers" and as a fluid loss material in well treating fluids. Ball sealers are rigid spheres added to a well treatment fluid to seal on perforations and divert flow of the treatment fluid to other perforations. Fluid loss additives are finely divided solid polymer particles that are dispersed in the fracturing fluid or other well treatment fluid and injected into a well. The polymers disclosed in the '964 patent include poly (D,L-lactide) and copolymers of lactide and glycolide.

A significant amount of research and development has been performed in recent years to commercialize polymers that degrade to water-soluble chemicals. In addition to the polylactic acid (PLA) polymers commercialized by Cargill Dow Polymers LLC, other degradable polymers, including other polyesters (based on polyethylene terephthalate, for example), starches, polycaprolactone, polyhydroxybutyrates and blends of these materials have been developed. Properties of lactide polymers are reviewed in the article "Properties of lactic acid based polymers and their correlation with composition," A. Sodergard and M. Stolt, Prog. in Pol. Sci., July, 2002. Further development is underway for other degradable or biodegradable polymers. Metabolix, Inc. of Cambridge, Mass., for example, is developing a family of degradable polymers known as PHAs (polyhydroxyalkanoates). PHA polymers (also polyesters) are produced by photosynthesis, either indirectly using highly efficient fermentation processes, or directly in plant crops. The price of these polymers is expected to decrease to about the cost of oil-derived polymers within a few years. The properties of such polymers can be adjusted by molecular weight distribution, crystallinity, co-polymers and additives to control physical properties and degradation time under selected environments. Polymers such as PLAs and selected PHAs, such as polyhydroxybutyrate, can be optimized for the applications disclosed herein by varying manufacturing methods and conditions. Polyydroxybutyrate will be, in general, more stable to degradation than PLA. Different polymerization variables can be controlled during manufacture and/or compounding to provide desirable degradation times under a broad range of environmental conditions that exist in underground formations. The PHAs can also be optimized by varying microbes used in the fermentation processes.

Degradation of solid polyesters occurs first by water penetrating the bulk of the polymer, preferentially attacking the chemical bonds in the amorphous polymer and converting long chains into shorter water-soluble fragments. Degradation rates can be controlled by incorporation of various additives. The control of properties of thermoplastic polymers by addition of plasticizers and other additives is well known. Of course, exposure of the plastics to moisture before their use can be controlled to prevent premature degradation. Biodegradable polymers may also be degraded by enzymes, which may be used to contact the polymers, as is known in the art. If there is need to increase the degradation rate of polymers left in a wellbore, for example, heating of the polymers in the wellbore can be used to increase degradation rate or the polymer may be contacted by a solution containing enzymes. The Sodergard and Stolt article, cited above, discusses biodegradation of degradable polymers, including polyesters, and polylactic acid in particular. The degradation rate (hydrolysis) of polylactic acids may be increased significantly by enzymes pronase, proteinase K and bromelain.

Since water is always present in hydrocarbon reservoirs and aqueous liquids are usually used in wellbore operations, there is nearly always a mechanism to cause polymer degradation of water-degradable polymers in a wellbore or in a reservoir. Rate of polymer degradation will depend primarily on polymer composition, polymer structure and temperature. For any degradable polymer selected, degradation time can be determined by heating a sample of the polymer to be injected. A water-degradable polymer can be exposed to an aqueous liquid and subjected to a thermal history simulating the conditions the polymer would experience in a well where it is to be used. The thermal history of the polymer as it is placed in a wellbore or injected down a wellbore and resides in the wellbore or the subsurface formation while degrading may be simulated in laboratory tests to select the polymer or copolymers and any additives used with the polymer.

A fracturing fluid, completion or workover wellbore fluid, fluid for carrying gravel into a fracpack or gravel pack or fluid for other well operations may be formed by polymerizing lactic acid to PLA or forming PHA or other biopolymer having a range of molecular weight that can be dissolved in an aqueous liquid to be used in the well operation and adding the resulting polymer to aqueous liquid. If the molecular weight of the manufactured PLA or PHA is too high to allow solubility in the aqueous liquid, the molecular weight of the polymer can be decreased by applying heat to the polymer in the presence of water. For example, steam or hot water may be applied to solid or liquid polymer for a selected time to obtain a molecular weight range of the polymer such that it can be dissolved in the aqueous liquid to be used in a well operation. Polymer having a desired range of molecular weight may be stabilized or partially stabilized against further decrease of molecular weight until it is used in a well operation by removing water from the polymer (drying) or by lowering the temperature of the polymer in an aqueous fluid.

The well treatment fluid disclosed herein may be placed in wellbore 10 (FIG. 1) by pumping the viscous polymer down the well from the surface as fluids of the prior art are pumped. The polymer is added to the aqueous well treatment fluid to a concentration selected to achieve the desired range of viscosity of the treatment fluid. The polymer may be cross-linked to increase the effective viscosity of the solution using well known cross-linking agents.

The properties of polylactide are affected by the isomeric content of the polymer. In addition to the D, L- polylactide disclosed in U.S. Pat. No. 4,716,964, discussed above, which is a racemic mixture, a polylactide formed from 13 percent D-isomer and 87 percent L-isomer, available from Cargill-Dow, is primarily amorphous in the solid state and degrades to form a viscous liquid in the presence of water. Preferably, a polymer that is amorphous or not highly crystalline in the solid state will be used to form the well treatment fluid of this invention. At the boiling point of water, viscous liquid formed from solid pellets of the 13 percent D-isomer material, whereas a polylactide containing only about 6 percent D-isomer did not degrade to a viscous liquid under the same conditions but degraded to a crystalline polymer. Therefore, the relative amount of D- and L-isomer should be selected in the range from about 10 percent to about 90 percent of an isomer or in a range to form an amorphous or not highly crystalline polymer. It is believed that isomer compositions in this range form an amorphous polymer and the lower molecular weight polymers and the oligomers formed during degradation form less crystalline material, allowing formation of the viscous liquid during degradation of the polymer. The viscous liquid can be diluted to form a solution having desired theological properties. Amorphous forms of other polyesters are preferred for the same reasons.

In addition to the application of degradable polymers to form viscous aqueous liquid for use in wells, the polymers may be applied in the solid form in a variety of processes or methods. The primary characteristic of the polymer in some of these applications is that the mechanical properties of the polymer change in a predictable manner with time in the presence of water or an aqueous liquid. If desired, an initial solid polymer may finally go in solution in the aqueous phase. In some applications, only a decrease in mechanical properties (modulus, bending strength, tensile or compressive strength, for example) in a predictable time range may be necessary for application of the polymer. In other applications, the polymer may maintain its mechanical properties until it is employed, then decrease in mechanical properties and become a low-strength gel or low-strength crystalline solid or become soluble in an aqueous phase in a wellbore.

In one embodiment of the invention disclosed herein, degradable polymer is used to coat a sand control screen or slotted liner before it is placed in a well. Such an application is described in a recently published U.S. Patent Application (No. 2002/0142919A1), which is hereby incorporated by reference. The material used to coat the screen is called a "binder." In the '919 Publication, it is disclosed that the binder may contain components that "react with potentially plugging materials in the near wellbore area" when the components are released as the binder melts or dissolves. Such components are well known (scale, paraffin and clays, for example). The use of wax and soluble solids as a binder is disclosed. The use of a water-degradable solid polymer that decreases in molecular weight with time is not disclosed.

Figure 2:
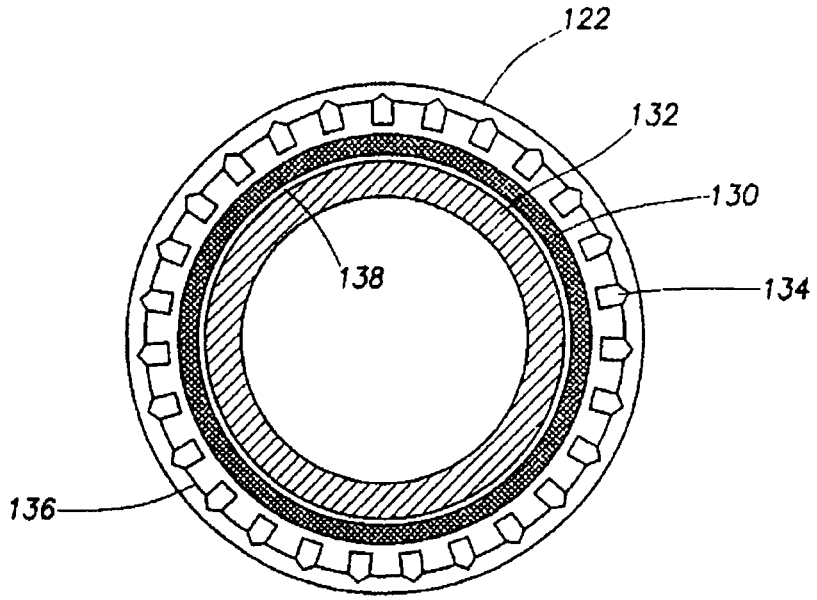
FIG. 2 shows a cross-section of a wire-wrapped sand control screen protected by a degradable polymer.

FIG. 2 shows a cross-section of a wire-wrapped sand control screen. The screen includes basepipe 130, stand-offs 134 and wire 136. Washpipe or tail pipe 132 is shown inside the screen. The protective coating on the screen is designated 122. It should be understood that a screen is illustrated, but a perforated liner or permeable sintered medium may be protected by a protective coating such as coating 122.

The use of PLA, PHA and other polyester polymers makes possible a timed degradation of the coating, rather than the employment of temperature alone or dissolution in a fluid as disclosed in the '919 Publication. The properties of the polyester may be selected to maintain sufficient mechanical strength to prevent displacement of the polymer from the screen as it is placed in a well. This time may be from several hours to days, depending on the time required to place the coated screen in a well. An example of the decrease in molecular weight of poly (DL-lactide) with time is provided in the paper "Further investigations on the hydrolytic degradation of poly (DL-lactide)," Biomaterials 20 (1999) 35-44. The data in the paper were obtained at 37° C. and at 60° C. As can be noted in the U.S. Pat. No. 4,716,964, referenced above, the rate of degradation is much more rapid at temperatures more typical of the temperature in wells. The polymer coating initially should have a melting point higher than the temperature expected in the well. The polymer should degrade to form a material that can be displaced from the well. If the polymer should flow outwardly from the screen, the polymer should not permanently damage permeability of the gravel placed in the well. Some or the entire polymer may be produced from the well as a viscous liquid. The initial strength of the solid polymer should be sufficient to prevent flow across the screen, in the area where the polymer is applied, under pressure differentials across the screen as it is placed in the well. The polymer coating may be used, for example, to prevent flow through only selected areas of the screen as it is put in a well. To increase initial strength of the polymer, a composite may be formed with the polymer by incorporating particles of a rigid solid, which may be a soluble crystalline material, for example, in the polymer before it is placed on the screen. Polymers having varying degradation rates may be used on different areas of a screen. For example, a more rapidly degrading polymer may be used over the lower portion of a screen.

Degradable polymer, such as PLA, may be applied to the screen, for example, by heating the polymer to allow flow or extrusion and coating the polymer on the finished screen. The screen may be heated before application of the polymer to allow more uniform flow of polymer into the screen. Alternatively, the polymer may be applied from solution in a solvent and the solvent removed to form a solid polymer. Alternatively, the base pipe or mandrel of the screen may be coated and the holes plugged with hot PLA or other water-degradable polymer before the wire of a screen is applied. Alternatively, blank pipe to be run into a well may be coated with the degradable polymer. The degradable polymer may be formulated to contain any or all the additives taught by the '919 Publication. The additives would then be released to enter the fluids around the screen or blank pipe as the polymer degrades.

Figure 3:
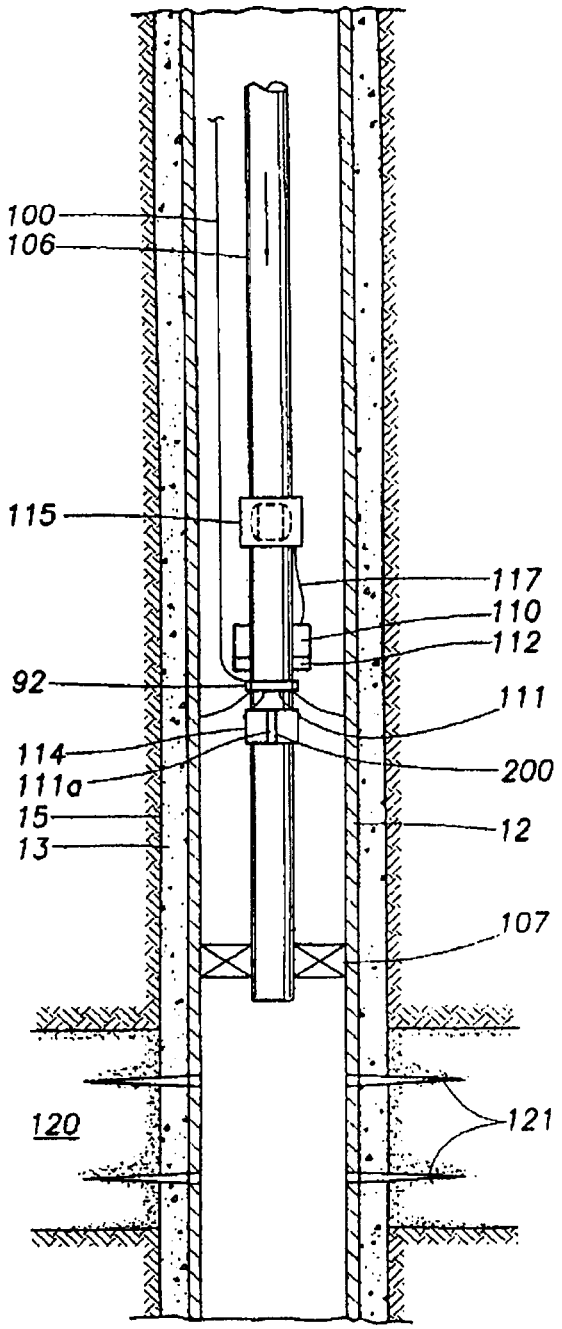
FIG. 3 shows spring-loaded apparatus in the annulus between tubing and casing in a well that is released by degradation of a degradable polymer.

There are reasons to attach various mechanical devices to the outside of tubulars as they are placed in a well. The devices may be used to measure physical or chemical variables or to modify flow conditions in the well, for example. A change in the position, status or operation of the device after a selected time may be desirable. A degradable polymer, such as PLA or a PHA, may be used to form a mechanical part of the device or a support for the device. The degradation rate of the degradable polymer may be selected to allow the desired change to occur in a selected range of time after placement of the device in a well. For example, FIG. 3 is adapted from U.S. Pat. No. 5,509,474. In this example, tubing 106 has been placed in a well inside casing 12. The annulus between tubing and casing will ordinarily be filled by an aqueous fluid. Sensors 111 are designed to be released from the vicinity of the outside surface of tubing 106 and then to spring against the inside wall of casing 12. An electromechanical device could be used to release the spring-loaded sensors. Alternatively, groove 200 may be formed in insulating material collar 114 and the spring-loaded sensors may be held in groove 200 by placing a selected solid water-degradable polymer over the sensor, shown at 111(a), in the groove, using techniques of placement such as described above for a screen. After tubing 106 is placed in a well in an aqueous fluid environment, polymer in groove 200 degrades to a range of mechanical properties (determined by the decrease in molecular weight of the degradable polymer) that allows sensor 111 to be released and to spring into the position shown at 111, which is in contact with the inside surface of casing 12.

The applications of degradable polymers disclosed herein to allow a timed change in location of a part or parts of mechanical devices can be readily seen by one of skill in the art of each device. The degradable polymer may easily be configured to allow the change to occur as compressive strength of the polymer degrades, as tensile strength degrades, as bending strength degrades, or as a combination of properties changes. The time of change can be determined by selecting a degradable polymer that changes in properties at a rate to allow the change to occur in a desired time range. This range may be hours, days or months, depending on the mechanical configuration and the polymer selected.

In other applications, flow configuration or pressure changes may be desired in a well after a selected time. For example, a port may preferably be opened after a selected time, in the range of hours, days or months. The port may be inaccessible or require expensive operations to open. For example, the port may be used to co-mingle fluid streams being produced from a well and be in an aqueous environment. A plug may be formed from a degradable polymer as disclosed herein. Tests can be performed with different polymer compositions to select the polymer providing the opening of the port in the desired time range and at the pressure differential existing across the port when in the well. Measurements of physical properties of a selected degradable polymer as a function of time and at selected temperatures in an aqueous environment may also be used to predict the time of opening of a selected port under selected conditions. Alternative, the polymer can be made in the form of a seal or gasket that degrades in time to allow flow. Such measurements and tests should take into account the dimensions of the degradable polymer body that is degrading, since such changes in properties are known to be affected by dimensions of the body, which affect the length of the diffusion path of water molecules into the degradable material and the diffusion path of reaction products from the polymer.

In another embodiment, mechanical devices or selected parts of mechanical devices that are placed in a well may be formed from solid degradable polymer such as PLA or PHA. For example, parts of a packer, a bridge plug or a cement retainer may be formed of water-degradable polymer. After a selected range of time, from hours, to days or months, the device or selected parts of the device may be designed to decrease in properties so as to release the device and facilitate retrieval. Alternatively, the entire device may be formed of a degradable polymer where strength of the polymer is adequate. For example, a nipple or pipe section may be formed of degradable polymer. The nipple or pipe may degrade and later be produced from a well. The pipe may be the "tail pipe" used in a sand control screen, for example.

Whereas the PLA used in fluids is preferably amorphous, as described above, the PLA used in mechanical or flow control devices may be amorphous or crystalline. The bending strength of rods of poly (D-lactide) (PLA) (which would be crystalline) when made by routine injection molding has been measured to be in the range of 40-140 MPA. Rods formed by solid state extrusion had bending strengths up to 200 MPA ("Enhancement of the mechanical properties of polylactides by solid-state extrusion," Biomaterials 17, (March, 1996, 529-535). Further information about PLA and its properties is provided in a chapter entitled "Present and Future of PLA Polymers" in the book Degradable Polymers, Recycling, and Plastics Waste Management, Ed. by Ann-Christine Albertsson and S. J. Huang, Marcel Dekker, Inc. It is well known that strength may be increased by the use of composites made of the thermoplastic polymer. Where added strength is desired, composite formed from a degradable polymer may be used. PLA, for example, can be molded as other thermoplastic materials are formed or it may be formed by extrusion other processing steps known in industry.

An example of a simple mechanical device that may be formed or partially formed from PLA or other water-degradable polymer is a flotation container to be attached to casing being run into a horizontal well. Such flotation devices made of metal are well known. The walls and ends of such a container may be formed from degradable polymer, with adequate supports of degradable polymer between the ends to prevent collapse, or the ends and supports may be formed of degradable polymer and designed to allow walls to collapse after a selected time in the well (and before cementing).

Other mechanical parts that may be more easily left in a well than retrieved may also be formed from degradable polymer such as PLA. For example, the case or container of perforating devices may be formed of degradable polymer. After a selected time, the device may then be easily flowed from the well, if desired.

Although the present invention has been described with reference to specific details, it is not intended that such details should be regarded as limitations on the scope of the invention, except as and to the extent that they are included in the accompanying claims.

I claim:

1. A method for gravel packing a well, comprising:

placing a screen or liner in the well, the screen or liner having a solid hydrolytically degradable polymeric coating, the polymer comprising a polyester, the coating covering the screen or liner to initially prevent entry of particles or fluid flow into or out of the screen or liner;

gravel packing the well; and allowing the polymer to degrade to form a material that can be displaced from the well.

2. The method of claim 1 wherein the solid hydrolytically degradable polymer comprises polylactic acid.

3. The method of claim 1 wherein the solid hydrolytically degradable polymer further comprises a solid material to increase strength of the polymer coating.

4. The method of claim 3 wherein the solid material is a soluble material.

5. The method of claim 1 wherein the solid hydrolytically degradable polymeric coating further comprises a chemical to be released to enter fluids around the screen or liner as the polymer degrades.

6. The method of claim 1 further comprising a plurality of solid hydrolytically degradable polymers having varying degradation rates on different areas of the screen or liner.

7. A method for gravel packing a well, comprising:

placing a sand control screen or liner in the well, the screen or liner having a base pipe or mandrel with apertures therein plugged with a solid hydrolytically degradable polymer, the polymer comprising a polyester.

8. The method of claim 7 wherein the solid degradable polymer further comprises a chemical to be released to enter fluids around the screen or liner as the polymer degrades.

* * * * *